(12) United States Patent
Zunke (10) Patent No.: US 8,495,388 B2
(45) Date of Patent: Jul. 23, 2013

(54) METHOD AND DEVICE FOR PROTECTING A PROGRAM COMPRISING A FUNCTIONAL BLOCK

(75) Inventor: Michael Zunke, Kirchheim (DE)

(73) Assignee: SFNT Germany GmbH, Germering (DE)

( * ) Notice: Subject to any disclaimer, the term of this patent is extended or adjusted under 35 U.S.C. 154(b) by 1533 days.

(21) Appl. No.: 11/611,868

(22) Filed: Dec. 17, 2006

(65) Prior Publication Data

US 2007/0143630 A1 Jun. 21, 2007

(30) Foreign Application Priority Data

Dec. 16, 2005 (EP) ...................................... 05027663

(51) Int. Cl.
*G06F 11/30* (2006.01)
(52) U.S. Cl.
USPC .......................................... 713/190; 713/194
(58) Field of Classification Search
USPC .................... 713/144, 190; 717/136
See application file for complete search history.

(56) References Cited

U.S. PATENT DOCUMENTS

| | | | |
|---|---|---|---|
| 6,405,316 B1* | 6/2002 | Krishnan et al. | 713/190 |
| 6,868,495 B1 | 3/2005 | Glover | |
| 6,895,506 B1* | 5/2005 | Abu-Husein | 713/193 |
| 7,000,119 B1* | 2/2006 | Jia et al. | 713/194 |
| 7,725,942 B2* | 5/2010 | Giraud | 726/26 |
| 2002/0138750 A1* | 9/2002 | Gibbs et al. | 713/193 |
| 2004/0193987 A1 | 9/2004 | Sigbjornsen et al. | |
| 2007/0006183 A1* | 1/2007 | Mensch et al. | 717/136 |
| 2007/0039046 A1* | 2/2007 | Van Dijk et al. | 726/22 |
| 2010/0122088 A1* | 5/2010 | Oxford | 713/168 |
| 2010/0275034 A1* | 10/2010 | Safa | 713/189 |

FOREIGN PATENT DOCUMENTS

EP 1288768 3/2003

OTHER PUBLICATIONS

Chang, Hoi et al., "Protecting Software Code by Guards", 2002, Springer-Verlag, Berlin Heidelberg, DRM 2001, pp. 160-175.*

* cited by examiner

*Primary Examiner* — Brandon Hoffman
*Assistant Examiner* — Carlos Amorin
(74) *Attorney, Agent, or Firm* — Drinker Biddle & Reath LLP (57) ABSTRACT

A program comprises a functional block. The functional block is encrypted, additional code is added to the program and a protected program is generated that is executable only in the presence of a predetermined license in a computer system which comprises a protection module for protection against unauthorized execution of the protected program. If the encrypted functional block is to be executed, the additional code is executed. If a license is present, the additional code and/or the protection module causes decryption of the functional block, allows execution of the decrypted functional block, and upon completion of execution of the functional block, causes removal of the decrypted functional block from the working memory.

13 Claims, 3 Drawing Sheets

METHOD AND DEVICE FOR PROTECTING A PROGRAM COMPRISING A FUNCTIONAL BLOCK

BACKGROUND OF THE INVENTION

The invention relates to a method or a device for protecting a program, comprising a functional block, against unauthorized execution and/or analysis.

Previously known methods and devices encrypt the program to be protected so as to generate a protected program. The protected program can be executed only on a computer system comprising a protection module. The protection module verifies, at the start and, where appropriate, also during execution of the program, the presence of a required license. If the license is present, the protected program is decrypted and loaded into the working memory of the computer system. If no license is present, no decryption is effected, and a corresponding message can be output via the computer system.

This allows one to prevent execution of an unauthorized copy of the protected program on other computer systems.

However, this has the disadvantage that the program or the corresponding parts of the program, respectively, that are stored in the working memory is/are no longer encrypted and is/are thus unprotected after license verification and decryption of the program. Accordingly, it is principally possible for an attacker to make a copy of the unprotected program on the basis of the program or program parts, respectively, present in the working memory, which copy would then also be executable on computer systems without the protection module.

In view thereof, it is an object of the invention to provide a method and a device for protecting a program, comprising a functional block, against unauthorized execution and/or analysis, by which method and device the above-mentioned disadvantages can be overcome virtually completely.

BRIEF SUMMARY OF THE INVENTION

According to the invention, the object is achieved by a computer-implemented method of protecting a program that comprises a functional block, wherein the functional block is encrypted, additional code is added to the program, thereby generating a protected program which is executable only if a predetermined license is present in a computer system comprising a working memory, into which the protected program is loaded during execution, and a protection module for protection against unauthorized execution of the protected program, wherein the additional code is executed when the encrypted functional block is to be executed during execution of the protected program, and, if the license is present, said code, together with the protection module, a) causes decryption of the functional block such that the functional block is present in the working memory of the computer system in decrypted form;

b) allows execution of the decrypted functional block, and c) causes removal of the decrypted functional block from the working memory upon completion of the execution of the decrypted functional block.

The method according to the invention advantageously generates a protected program in which, during execution thereof, the decrypted functional block is temporarily present only when the decrypted functional block is being executed. Before and after its execution, the decrypted functional block is not present in the working memory. Thus, it is loaded into the working memory only for the time during which it is actually to be executed and is then removed from the working memory again.

This effectively prevents any analysis and/or copying of the protected program by way of the program present in the working memory, because the decrypted functional block is present in the working memory only temporarily, and it is not apparent to an attacker at what time this is the case. Preventing analysis is an effective way of preventing undesired reverse engineering.

In particular, several functional blocks can be encrypted in a further embodiment. These functional blocks may be located, in particular, at different locations of the program sequence, so that during execution of the protected program in the computer system at least two of the encrypted functional blocks are never simultaneously present in decrypted form in the working memory. Thus, an attacker can never see the entire (unprotected) program in the working memory and, thus, cannot make an unauthorized copy of the unprotected program or carry out an analysis of the unprotected program, respectively.

The program to be protected is usually an executable program. In particular, the functional block(s) comprise(s) a respective sequence of instructions which, when being executed, realizes a desired function. Said function may be an internal function of the program (for example, in the manner of a subprogram) or a function having a direct external effect (for example, generating a corresponding message on the screen of the computer system).

Since at least the functional block encrypted by the method of the invention is practically impossible to copy from the working memory by an attacker, the attacker's copy will be missing at least the encrypted functional block. Therefore, he will not be able to make a complete copy and/or analysis of the program.

In particular, in step a) the additional code may cause the decrypted functional block(s) to be adapted to the computer system such that the functional block(s) present in decrypted form in the working memory of the computer system can be executed only in this particular computer system. Thus, an adaptation of the decrypted functional block(s) to the specific run-time environment is effected in step a) such that in the working memory only the adapted, decrypted functional block(s) is/are present at all times (i.e. also at the time when they are being loaded into the working memory but are not being executed yet) and a copy of the decrypted functional block(s) is useless for an attacker, if he can make such a copy in the first place. The copied, decrypted functional block(s) has (have) been dynamically adapted to the present run-time environment in step a) such that they are not executable in other run-time environments or other computer systems, respectively. Preferably, at least part of said adaptation is effected in the protection module.

The additional code being added to the program may cause the functional block to be decrypted during execution in the computer system such that the entire functional block is present in decrypted form in the working memory of the computer or that only that part of the functional block which is presently needed is always present in decrypted form in the working memory of the computer. If only part of the functional block is always present in decrypted form in the working memory, this will make it even more difficult for an attacker to copy the decrypted functional block using the decrypted functional block present in the working memory.

Of course, the additional code can also realize further functions. Thus, for example, a conventional license verification may be implemented, which verifies the presence of the license before execution of the protected program is started and which allows execution of the protected program only if the license is present.

Further, the additional code and the protection module enable licensing at the level of the functional blocks. Where several functional blocks are encrypted by the method of the invention, the required license may comprise the individual licensing of individual functional blocks, for example.

The protection module may be a hardware module, which can be connected via a standardized interface (e.g. USB interface), for example. Of course, the protection module may also be realized by suitably protected software. In particular, the protection module may be a combination of hardware and software.

In particular, the computer-implemented method comprises adding additional code which causes removal of the decrypted functional block from the working memory in step c) by deallocating the respective area in the working memory again and/or by actually being physically deleted. The physical deletion may be effected by overwriting the corresponding area in the working memory with random numbers or predetermined values.

In the computer-implemented method, the functional block to be encrypted can be determined automatically. This may be effected, for example, by analyzing the program to be protected and by detecting as the functional block the sequence of instructions between two predetermined instructions or between two entry points, respectively. However, it is also possible, for example, to evaluate additional information generated when compiling the program (e.g. mapfile, debug information).

When encrypting the functional block, the functional block may be cut out from the program, on the one hand, so that the program (without the additional code and the encrypted functional block) is reduced in size. Alternatively, it is possible to fill and/or overwrite the corresponding segment of the program with the additional code, so that the size of the program remains the same. For overwriting, use can be made of random code, zeros, or what is called pseudocode and looks like code of the program to an attacker, but is, in fact, never executed during execution of the program.

The functional block to be encrypted may contain a first instruction segment which, during execution, would determine information that is a function of the computer system, as well as a second instruction segment which, during further execution, would use the determined information. In this case, in a further embodiment, the method comprises a further step prior to encrypting, in which further step auxiliary code is added to the functional block, which auxiliary code replaces the first instruction segment, is executed in step a) and causes the information required for the second instruction segment to be already inserted in the functional block which is present in the working memory in unencrypted form.

The required information is preferably determined already prior to steps a)-c), e.g. by means of the additional code, so that a greater spatial and temporal separation is present between determining and using the information as compared to the original functional block to be encrypted.

Execution of the first instruction segment has an external effect visible to an attacker, since information that is a function of the computer system is determined. Now, if the functional block is to be executed several times during execution of the program, the first instruction segment would also be executed several times so that the external effect would be noticeable for an attacker every time. Execution of the auxiliary code then has the advantageous effect that the required information need not be procured anew each time. It can be determined once during execution of the program and then only has to be inserted during each decryption of the functional block. Thus, the external effect appears to the attacker in a different place during execution of the program and may also appear less frequently.

In particular, the additional code may determine, during its execution, the information that is a function of the computer system. If said information does not change during execution of the program or, if at all, only from execution to execution of the complete program, it is sufficient for the additional code to determine said information only once. The information may be, for example, the version of the computer system's operating system, the identification number of the current process, and the identification of the current thread.

During its execution in step a), the additional code may have the effect that the decrypted functional block has a free area of the working memory allocated to it by the computer system. Thus, the operating system, for example, determines (in a random manner) where the decrypted functional block is located in the working memory. This makes the attack more difficult, because it is not possible for an attacker to predict where the functional block, which is present only temporarily, will be stored in the working memory.

In particular, the additional code may have the effect, during its execution, that an area of the working memory is reserved, said reserved area being larger than the memory area required by the decrypted functional block, and said additional code determining for step a) in which segment of the reserved area the decrypted functional block is to be stored and preferably also causing the required adaptations (in particular address adaptations) in the functional block and/or in the rest of the program. Preferably, at least part of said adaptation is effected in the protection module. Thus, it is not predictable for an attacker where the dynamically generated decrypted functional block will be located in the working memory.

Further, during its execution, the additional code may cause several areas of the working memory to be reserved, each of said areas being at least as large as the memory area needed by the decrypted functional block. The additional code determines for step a) in which of the reserved areas the decrypted functional block will be stored and preferably also effects the required adaptations (in particular, address adaptations) in the functional block and/or in the rest of the program. Preferably, at least part of said adaptation is effected in the protection module. Again, this has the advantageous effect that it will not be predictable where the decrypted functional block, generated only temporarily, will be located in the working memory.

During its execution, the additional code can determine the segment or area, respectively, as a function of the hardware and/or of the software of the computer system. For example, this may have the effect that, as a function of the actual computer system on which execution takes place, the decrypted functional block is stored at a predetermined location in the working memory. This makes an attack even more difficult, because the memory area for the decrypted functional block is not determined in a generally valid manner, and a copy of the decrypted functional block is not executable in other computer systems, because the preferably effected address adaptation causes the present computer system to have a functional block which is not executable in this form in any other computer system. Further adaptations would be required but these are not apparent to the attacker from the copied functional block.

The additional code and, where appropriate, the auxiliary code can be carried out, at least in part, in the protection system. This further increases security against preparing an unprotected copy of the protected program.

The described further embodiments can also be applied, of course, in case several functional blocks are encrypted.

Further, a computer program product is provided which comprises software code in order to carry out the steps of one of the above computer-implemented methods of protecting a program that comprises a functional block and/or its described further embodiments, when the product is being executed on a computer.

A method is provided for execution of a protected program in a computer system comprising a working memory into which the protected program is loaded during execution, and a protection module for protection against unauthorized execution of the protected program, said protected program comprising a functional block which is present in encrypted form and is executable only in the presence of a predetermined license in the computer system. If the encrypted functional block is to be executed during execution of the protected program, the protection module, in the presence of a license, a) causes decryption of the functional block such that the functional block is present in the working memory of the computer system in decrypted form;

b) allows execution of the decrypted functional block, and c) causes removal of the decrypted functional block from the working memory upon completion of the execution of the decrypted functional block.

Using this method for execution of a protected program in a computer system has the advantageous effect that the encrypted functional block is present in decrypted form in the working memory only temporarily, so that the preparation of a copy and/or an analysis of the protected program on the basis of the data in the working memory is made more difficult for an attacker.

The method for execution of a protected program can cause an adaptation of the decrypted functional block to the computer system in step a) such that the decrypted functional block is executable only in the computer system. Preferably, at least part of said adaptation is effected in the protection module. As compared to the rest of the computer system, the protection module is better protected against attacks, such as unauthorized preparation of a program copy or unauthorized or undesired analysis of the protected program, for example. The protection module may be a hardware module, a software module or a hardware/software module and may, in particular, comprise additional code contained in the protected program.

The method for execution of a protected program in a computer system can cause decryption of the functional block such that computer system-dependent information needed to execute the functional block is already inserted in the functional block that is present in the working memory in decrypted form.

In step a), the method for execution of the protected program may cause a free area of the working memory to be allocated to the decrypted functional block. Further, the method for execution of the protected program may reserve an area of the working memory larger than the memory area needed by the decrypted functional block, or it may reserve several areas of the working memory which are each at least as large as the memory area needed by the decrypted functional block. Depending, in particular, on the hardware and/or software of the computer system, the method may determine in which area of the several areas or in which segment of the larger area the decrypted functional block will be stored.

In particular, the method for execution of a protected program can be further embodied such that a protected program can be executed, which program has been protected according to the described method for protection of a program comprising a functional block and, in particular, according to the corresponding embodiments of said method.

The object is further achieved by a device for protection of a program, comprising a functional block. against unauthorized execution, wherein the device comprises a protection unit which encrypts the functional block, adds additional code to the program and thus generates a protected program which is executable only in the presence of a predetermined license in a computer system that comprises a working memory into which the protected program is loaded for execution and a protection module for protection against unauthorized execution of the protected program, wherein, if the encrypted functional block is to be executed during execution of the protected program, the additional code is executed and, if the license is present, said additional code, together with the protection module a) causes decryption of the functional block such that the functional block is present in the working memory of the computer system in decrypted form;

b) allows execution of the decrypted functional block, and c) causes removal of the decrypted functional block from the working memory upon completion of the execution of the decrypted functional block.

The protection unit may be further embodied in a manner allowing to realize the further embodiments of the method for protection of a program comprising a functional block.

BRIEF DESCRIPTION OF THE DRAWINGS

The invention will be explained in more detail below, by way of example and with reference to the drawings, wherein.

DETAILED DESCRIPTION

In the following, there will be described a first embodiment of the computer-implemented method according to the invention for protection of a program, comprising a functional block, against unauthorized execution.

Figure 1:
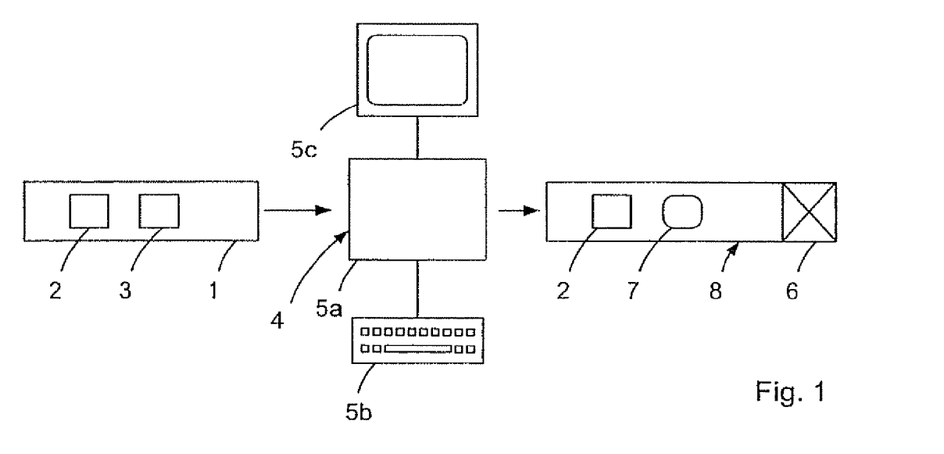
FIG. 1 schematically shows an embodiment of the device for protecting a program comprising a functional block.

The program 1 to be protected comprises several functional blocks, of which only two functional blocks 2, 3 are schematically shown for the sake of simplicity. A functional block is understood herein, in particular, to be a sequence of instructions which realizes a desired function during execution. Said function may be an internal function of the program or one which has an external effect.

The program 1 to be protected is supplied to a computer 4 which comprises a computing module 5a (including, e.g., a processor, a hard disk, further hardware elements as well as an operating system), an input unit 5b (in this case, a keyboard, for example) as well as an output unit 5c (e.g. a screen).

The computer 4 automatically determines the functional block 3, encrypts the functional block 3 and adds it in encrypted form 6 to the program 1. Further, the original functional block 3 is replaced by additional code 7 such that a protected program 8 is then present. In the schematic representation in FIG. 1, the additional code 7 is represented by a quadrangle rounded off at the corners. The encrypted functional block 6 is represented as a quadrangle with diagonal lines drawn in.

The protected program 8 can be executed on computer systems only if a predetermined license is present. In such a computer system 10 shown in FIG. 2, the presence of the license can be verified, for example, by means of a protection module 9 which is part of the computer system 10 as shown or which is connected to the computer system 10, respectively. The computer system 10 further comprises a computing unit 11 (comprising a processor, a working memory 12 and other hardware elements, including an operating system), an output unit 13 in the form of a screen as well as a keyboard 14 as the input unit. The computer system 10 is preferably a different system than the computer 4, by which the protected program 8 is generated from the program 1 to be protected.

Figure 2:
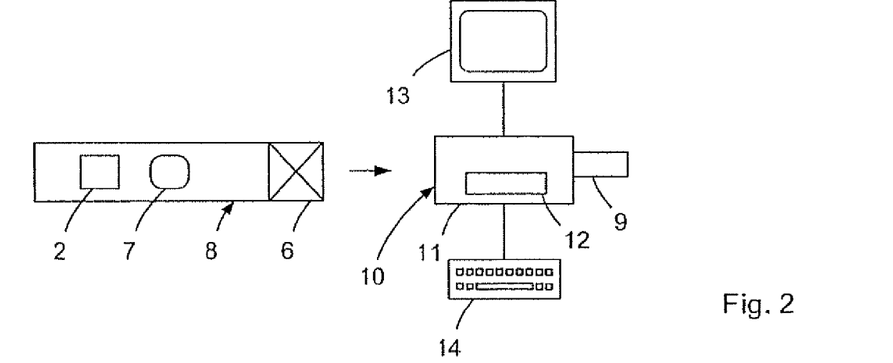
FIG. 2 schematically shows a computer system on which the protected program is executable.

When the protected program 8 is to be executed on the computer system 10, the protection module 9 carries out a license verification. The protection module 9 allows execution of the protected program 8 only in the presence of the license. This may be realized, for example, by decrypting the encrypted functional block 6 only if the license is present. As an alternative or in addition, a license verification can be carried out at any other time in a known manner by means of the protection module 9.

During execution of the protected program 8 in the computer system 10 the additional code 7, combined with the protection module 9, has the effect that the encrypted functional block 6 is decrypted and loaded into the working memory 12 of the computer system 10 only if execution of the protected program 8 requires the functional block 3 which is present in the protected program 8 only in encrypted form. Further, the additional code 7 has the effect that the decrypted functional block is deleted from the working memory 12 again after the functional block has been executed. This has the advantageous effect that the decrypted functional block is present in the working memory 12 only temporarily, i.e. only when it is actually needed. This makes it difficult for attackers to bypass the protection of the protected program 8 by generating a copy of the program at the time of execution, which copy is then possibly no longer protected.

Figure 3A:
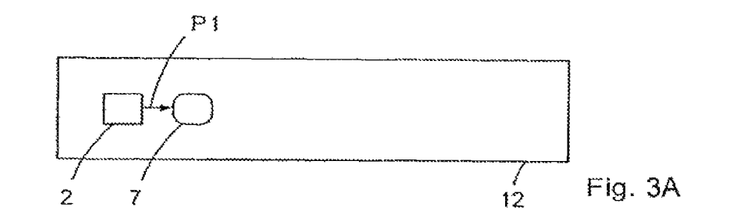
FIGS. 3A-3E schematically show the working memory of the computer system of FIG. 2 as well as the parts of the program loaded into the working memory.

The exact sequence of execution of the protected program 8 will be explained below in connection with FIGS. 3A-3E, wherein the working memory 12 and the parts of the program 8 loaded into the working memory are respectively shown in a schematic manner. FIG. 3A schematically shows the working memory at a point in time where the program 8 is being executed in the computer system 10 and the functional block 2 as well as the additional code 7 have been loaded into the working memory 12. The functional block 2 calls the functional block 3, as indicated by the arrow P1. Since the functional block 3 has been replaced by the additional code 7, instructions of the additional code 7 and not of the functional block 3, are now being executed.

The instructions of the additional code 7 cause the encrypted functional block 6 to be loaded into the working memory 12. In the embodiment described herein this is effected such that the operating system of the computer system 10 predetermines a free area of the working memory 12 for this purpose.

Figure 3B:
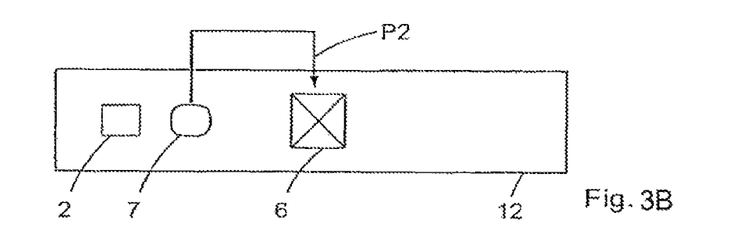

Loading of the encrypted functional block 6 into the working memory 12 is indicated in FIG. 3B by the arrow P2. Before executing this step, a license verification is also carried out by means of the protection module 9. The step in FIG. 3B is carried out only if the license is present. If no license is present for the program 8, execution of the program 8 is interrupted at this point and a corresponding message is output to the user via the screen 13.

Figure 3C:
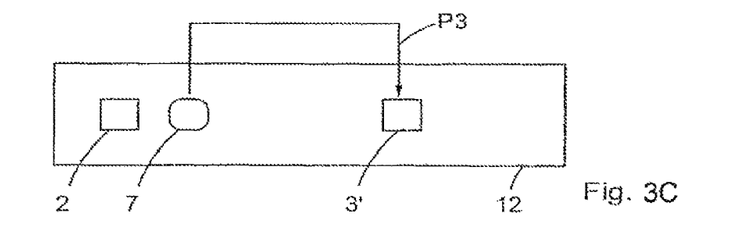
Figure 3D:
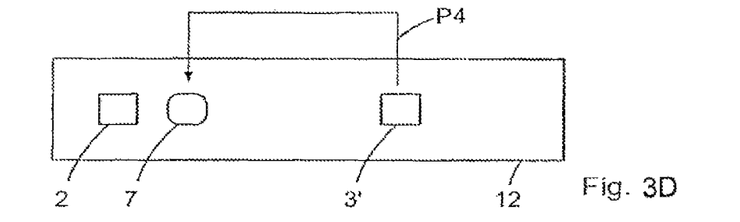
Figure 3E:
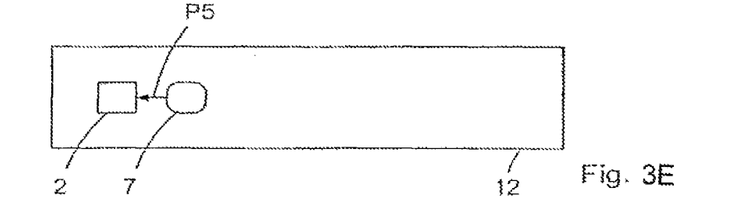

However, if to license is present, as assumed in this case, the encrypted functional block 6 is loaded into the working memory 12 and then the encrypted functional block 6 is decrypted by means of the protection module 9 and the additional code 7, and is stored in the working memory 12 in decrypted form, as indicated by the arrow P3 in FIG. 3C. The encrypted functional block 3' can be stored at another location in the working memory 12, which location may in turn be predetermined by the operating system. As an alternative, it is also possible that the decrypted functional block 3' is stored at the same location as the encrypted functional block 6 and that the encrypted functional block 6 is thus overwritten.

Next, the instructions of the decrypted functional block 3' are then executed so that the function provided by the original functional block 3 is realized. Upon completion of execution of the decrypted functional block 3', the additional code 7 is returned to, as indicated by the arrow P4 in FIG. 3D. The additional code 7 then causes the decrypted functional block 3' to be removed from the working memory 12. This may be realized, for example, by freeing the corresponding memory area in the working memory 12 and/or by effecting physical deletion. Said physical deletion may be realized by overwriting (e.g. with random numbers) the area of the working memory 12 in which the decrypted functional block 3' is stored. The additional code 7 then branches back to the functional block 2, as indicated by the arrow P5, so that execution of the program 8 can be resumed as initially envisaged.

Thus, the additional code 7 causes the normal program sequence to take place; however, the encrypted functional block 6 is only temporarily present in decrypted form in the working memory 12 during the period of time for which it is actually needed. Immediately upon termination of the execution of the decrypted functional block 3', the decrypted functional block 3' is removed from the working memory 12.

In the step shown in FIG. 3C, the area in which the decrypted functional block 3' is stored is predetermined by the operating system. However, it is also possible that an area of the working memory 12 greater than the memory area needed by the decrypted functional block 3' is reserved by means of the additional code 7. The segment of the reserved area where the decrypted functional block 3' is stored in the working memory 12 is then determined, for example in a random manner, so that the decrypted functional block 3', if it is called several times during execution of the program, is stored in different segments. Alternatively, it is possible that the segment is determined as a function of the hardware and/or software of the computer system 10 and, thus, remains the same when called several times in the same computer system.

Further, it is also possible that the additional code reserves several areas of the working memory 12, each having at least the same size as the memory area needed by the decrypted functional block 3'. During the step in FIG. 3C, it is then determined in which of the reserved areas the decrypted functional block will be stored. Again, this may be effected, for example, in a random manner or as a function of the hardware and/or software of the computer system 10.

Figure 4:
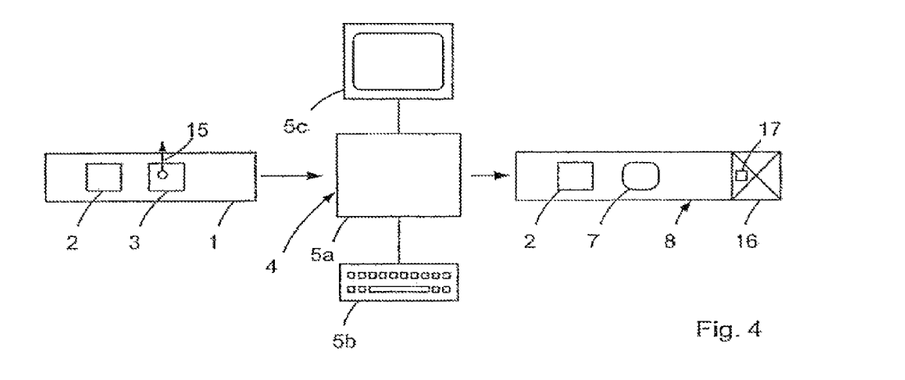
FIG. 4 schematically shows an embodiment of the device for protecting a program comprising a functional block.

FIG. 4 schematically shows a further embodiment of the computer-implemented method according to the invention for protection of a program 1, comprising a functional block, against unauthorized execution. Again, the program 1 to be protected contains functional blocks 2 and 3, with the functional block 3 containing an instruction segment 15 which, if executed as such in the computer system 10, would determine information that is a function of the computer system 10. Said information is, in particular, information which does not change during execution of the program but can change from one execution to another or even from one computer system to another. Examples are the version number of the operating system used on the computer system, an identification number of the current process, the identification number of the current thread, etc.

Figure 5A:
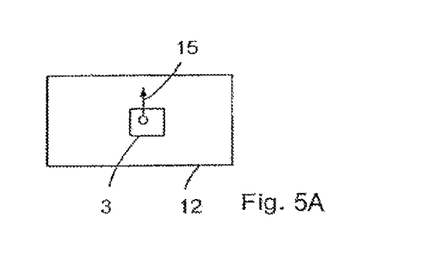
FIGS. 5A and 5B schematically show the working memory as well as the loaded functional block 3 of the unprotected program 1.
Figure 5B:
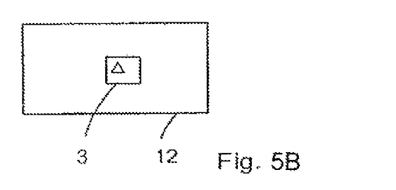

FIGS. 5A and 5B show how the functional block 3 would be stored in the working memory 12 if the unprotected program 1 were being executed on the computer system 10. In this case, the functional block 3 would be loaded into the working memory (FIG. 5A). This would be followed by execution of the functional block or of the first instruction segment 15, respectively, which determines the desired information and inserts it in the functional block 3, as indicated by the triangle drawn in FIG. 5B.

The program 1 to be protected is supplied to the computer 4 here in the same manner as according to the method described in connection with FIG. 1. The computer 4 determines the functional block 3, encrypts it and adds it to the program 1 as encrypted functional block 16, and adds additional code 7 at the location of the previous functional block 3. However, the functional block 3 is not only encrypted, but auxiliary code 17 is also added before encryption, to replace the first instruction segment 15 as schematically shown in FIG. 4. Thus, a protected program 8 is present again.

Figure 6A:
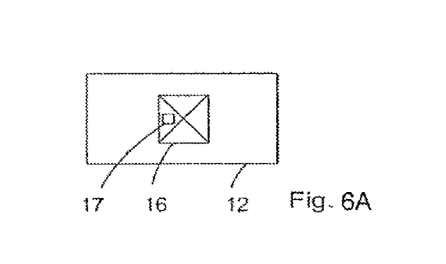
FIGS. 6A and 6B show the working memory 12 including the temporarily loaded decrypted functional block 3'.
Figure 6B:
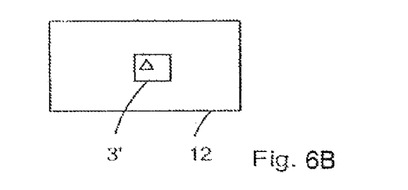

Execution of the protected program 8 is effected in substantially the same manner as described in connection with FIGS. 2 and 3 concerning the first embodiment. Only in step 3c (shown in FIG. 6A) is the auxiliary code 17 still carried out additionally, which causes the dynamic information to be statically registered in the decrypted functional block 3' already before the decrypted functional block 3 is being executed, as shown in FIG. 6B.

In the embodiments described so far, the additional code 7 is incorporated into the program 1 to be protected such that said code is located at that location which corresponds to the location in the functional block 3 which are called by other functional blocks 2 of the program to be protected. Thus, the additional code 7 is inserted at the location to be called or at the segment to be called, respectively, in the functional block 3. It is also possible, of course, to hook the additional code 7 in at those locations in the program 1 which call the functional block 3 (i.e. at the calling locations). In this case, the functional block 3 is preferably overwritten or removed completely from the program 1 to be protected.

The described embodiments respectively refer to one single functional block 3 being encrypted. It is also possible, of course, to encrypt several functional blocks according to the method described herein. In this case, the size of the area(s) of the memory is always selected relative to the maximum storage space required by the functional block(s) to be carried out at the same time.

The invention claimed is:

1. A computer-implemented method for protecting a program comprising an encrypted functional block, wherein the functional block contains a first instruction segment which, during execution, determines information that is a function of the current run-time environment on the computer system, as well as a second instruction segment which would use the determined information during further execution, the method comprising:

adding additional code to the program to generate a protected program executable only in the presence of a predetermined license in a computer system that includes a working memory into which at least a portion of the protected program is loaded during execution, providing a protection module for protection against unauthorized execution of the protected program, loading the computer program on the computer system, in the computer system, adding auxiliary code to the functional block to replace the first instruction segment, wherein when the additional code is executed the additional code causes the information needed for the second instruction segment to be determined and statically registered in the functional block, encrypting the functional block including the auxiliary code, when executing the protected program on the computer system, to execute the functional block;

executing the additional code and, if a license is present, causing by at least one of said additional code and said protection module decryption of the functional block, causing adaptation of the decrypted functional block to the current run-time environment of the computer system, causing the adapted decrypted functional block to be present in the working memory of the computer system, such that the adapted decrypted functional block executes only in the current run-time environment on the computer system, and executing the auxiliary code and thereby determining the information that is a function of the current run-time environment on the computer system and statically registering the determined information in the functional block, and subsequently executing the second instruction segment and, when the second instruction segment would use the determined information during further execution, supplying the statically registered determined information from the auxiliary code.

2. The method as claimed in claim 1, wherein the adaptation of the decrypted functional block uses at least one of information of the computer system, information of the computer system's operating system, and information of the current program execution instance.

3. The method as claimed in claim 1, wherein the statically registered information is used to ensure the decrypted functional block operates only in the current run-time environment on the computer system.

4. The method as claimed in claim 1, wherein the additional code, during its execution, causes a tree area of the working memory to be allocated to the decrypted functional block by the computer system.

5. The method as claimed in claim 1, wherein the additional code, during its execution, causes an area of the working memory to be reserved, said reserved area being larger than the memory area needed by the decrypted functional block, and wherein the additional code determines, for the adaptation of the decrypted functional block, in which segment of the reserved area the decrypted functional block is to be stored.

6. The method as claimed in claim 5, wherein the additional code, during its execution, determines said segment as a function of at least one of the hardware and software of the computer system.

7. The method as claimed in claim 1, wherein the additional code, during its execution, causes a plurality of areas of the working memory to be reserved, each of these areas respectively being at least as large as the memory area needed by the decrypted functional block, wherein the additional code determines, for the adaptation, in which reserved area the decrypted functional block will be stored.

8. The method as claimed in claim 7, wherein the additional code, during its execution, determines said area as a function of at least one of the hardware and software of the computer system.

9. The method as claimed in claim 1, wherein the additional code is carried out, at least in part, in the protection module.

10. The method as claimed in claim 9, wherein the auxiliary code is carried out, at least in part, in the protection module.

11. A computer program product, which comprises a computer readable storage device storing computer-readable software code which, when read by a computer, causes the computer to carry out a method for protecting a program comprising an encrypted functional block, wherein the functional block contains a first instruction segment that, during execution, determines information that is a function of the current run-time environment on the computer system, as well as a second instruction segment that would use the determined information during further execution, the method comprising:
adding additional code to the program to generate a protected program executable only in the presence of a predetermined license in a computer system that includes a working memory into which at least a portion of the protected program is loaded during execution,
providing a protection module for protection against unauthorized execution of the protected program,
loading the computer program on the computer system,
in the computer system, adding auxiliary code to the functional block to replace the first instruction segment, wherein when the additional code is executed the additional code causes the information needed for the second instruction segment to be determined and statically registered in the functional block,
encrypting the functional block including the auxiliary code,
when executing the protected program on the computer system, to execute the functional block;
executing the additional code and, if a license is present,
causing by at least one of said additional code and said protection module decryption of the functional block,
causing adaptation of the decrypted functional block to the current run-time environment of the computer system,
causing the adapted decrypted functional block to be present in the working memory of the computer system, such that the adapted decrypted functional block executes only in the current run-time environment on the computer system, and
executing the auxiliary code and thereby determining the information that is a function of the current run-time environment on the computer system and statically registering the determined information in the functional block, and
subsequently executing the second instruction segment and, when the second instruction segment would use the determined information during further execution, supplying the statically registered determined information from the auxiliary code,
such that the adapted decrypted functional block executes only in the current run-time environment on the computer system.

12. A device for protecting a program comprising a functional block against unauthorized execution, wherein the functional block contains a first instruction segment that, during execution, determines information that is a function of the current run-time environment on the computer system, and a second instruction segment that would use the determined information during further execution, said device comprising:
a computing module having a processor programmed to encrypt the functional block and to add additional code to the program to generate a protected program executable only in the presence of a predetermined license in a computer system including a working memory into which the protected program is loaded during execution, and that uses a protection module for protection against unauthorized execution of the protected program, and programmed prior to encryption, in which step auxiliary code is added to the functional block, to replace the first instruction segment, the auxiliary code when it is executed causing the information needed for the second instruction segment to be determined and statically registered in the functional block,
wherein when the processor executes the functional block during execution of the protected program, the additional code is executed and, if a license is present, said additional code, together with the protection module, causes decryption of the functional block, causes adaptation of the functional block to the current run-time environment such that the adapted decrypted functional block executes only in the current run-time environment on the computer system, and causes the adapted decrypted functional block to be present in the working memory of the computer system, and the auxiliary code causes the processor to determine and statically register the information needed for the second instruction segment, and when the second instruction segment would use the determined information the auxiliary code provides the statically registered information.

13. A method for execution of a protected program in a computer system which comprises a working memory into which the protected program is loaded during execution, and a protection module for protection against unauthorized execution of the protected program,
wherein the protected program comprises a functional block which is present in encrypted form and is executable only in the presence of a predetermined license in the computer system, the method comprising:
if the encrypted functional block is to be executed during execution of the protected program, the protection module, if the license is present, causing decryption and adaptation of the functional block such that the adapted functional block is present in the working memory of the computer system in decrypted form,
adapting the decrypted functional block to the current run-time environment of the computer program on the computer system such that the adapted decrypted functional block executes only in the current run-time environment on the computer system,
determining information that is a function of the current run-time environment on the computer system and statically registering the determined information in the functional block, by executing auxiliary code in the functional block,
subsequently executing a second instruction segment in the functional block that would use the determined information during further execution, and
when the second instruction segment in the functional block would use the determined information, using the statically registered determined information.

* * * * *